United States Patent
Smithwick

(10) Patent No.: US 11,624,905 B2
(45) Date of Patent: Apr. 11, 2023

(54) CORRECTOR PLATES FOR HEAD MOUNTED DISPLAY SYSTEM

(71) Applicant: Disney Enterprises, Inc., Burbank, CA (US)

(72) Inventor: Quinn Yorklun Jen Smithwick, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 608 days.

(21) Appl. No.: 16/598,818

(22) Filed: Oct. 10, 2019

(65) Prior Publication Data

US 2020/0132988 A1 Apr. 30, 2020

Related U.S. Application Data

(60) Provisional application No. 62/750,654, filed on Oct. 25, 2018.

(51) Int. Cl.
*G02B 27/00* (2006.01)
*G02B 27/01* (2006.01)

(52) U.S. Cl.
CPC ..... *G02B 27/0025* (2013.01); *G02B 27/0172* (2013.01); *G02B 2027/011* (2013.01)

(58) Field of Classification Search
CPC .......... G02B 27/0025; G02B 27/30; G02B 27/0179; G02B 27/0176; G02B 27/017; G02B 27/0149; G02B 27/0101; G02B 27/0172; G02B 2027/011; G02B 2027/0116; G02B 2027/013; H04N 5/7491; H04N 13/20–296
USPC ............ 359/13–14, 629–633, 462–477, 726; 348/42, 115, 51–60; 345/7–9; 349/15
See application file for complete search history.

(56) References Cited

U.S. PATENT DOCUMENTS

| | | | | |
|---|---|---|---|---|
| 4,034,398 A | * | 7/1977 | Sheldrake | G02B 27/18 313/474 |
| 6,060,702 A | * | 5/2000 | Simpson | G02B 17/08 359/399 |
| 6,871,956 B1 | * | 3/2005 | Cobb | G02B 17/08 348/E13.058 |

(Continued)

OTHER PUBLICATIONS

Bao-Zhu Pan, Hao-Bo Cheng, Yong-Fu Wen, Zhi-Chao Dong, Hon-Yuen Tam, A mathematical model of Schmidt corrector plate with defocus in variable for quick F ratio and large aperture systems, Optik, (Year: 2012).*

(Continued)

*Primary Examiner* — Travis S Fissel
(74) *Attorney, Agent, or Firm* — Patterson + Sherdan, LLP

(57) ABSTRACT

The embodiments herein use a corrector plate or a light field display in an AR/VR display device to compensate for sub-optimal collimation at the edge of the FOV. In one embodiment, the corrector plate is disposed between the collimator and the viewer so that the light at the edge of the FOV can be corrected so that the aberrations mentioned above do not occur. In another embodiment, rather than using a corrector plate, the AR/VR display device can include a light field display that can use color intensity to pre-distort emitted light to compensate for sub-optimal collimation at the edge of the FOV. In this manner, the AR/VR display device can mitigate aberrations or distortions as the user moves her eyes relative to the display device.

13 Claims, 11 Drawing Sheets

(56) References Cited

U.S. PATENT DOCUMENTS

| | | | |
|---|---|---|---|
| 2016/0018654 A1* | 1/2016 | Haddick | G09G 3/3225 |
| | | | 345/8 |
| 2016/0042501 A1* | 2/2016 | Huang | G06T 5/003 |
| | | | 345/428 |
| 2016/0097930 A1* | 4/2016 | Robbins | G02B 27/0172 |
| | | | 359/619 |

OTHER PUBLICATIONS

Modern Optical Engineering, the Design of Optical Systems, by Warren J. Smith pp. 393-394 (Year: 1966).*

* cited by examiner

CORRECTOR PLATES FOR HEAD MOUNTED DISPLAY SYSTEM

CROSS-REFERENCE TO RELATED APPLICATIONS

This application claims benefit of U.S. provisional patent application Ser. No. 62/750,654, filed Oct. 25, 2018. The aforementioned related patent application is herein incorporated by reference in its entirety.

BACKGROUND

Computer graphics technology has significantly progressed since the first video games were developed. Relatively inexpensive 3D graphics engines can now produce nearly photo-realistic interactive virtual environments. Virtual reality (VR) in particular involves generating images, sounds, etc. that simulate a user's presence in a virtual environment, typically using specialized equipment such as VR headsets. In contrast, augmented reality (AR) involves superimposing computer generated imagery on a user's view of the real-world environment.

VR/AR head-mounted displays, as well as other types of displays such as those of flight simulators, can require a wide field of view and high resolution with a large eyebox. A simple magnifier is one approach for making a wide field of view, high-resolution display with a large eyebox. A display device with a simple magnifier typically includes a display disposed at a focal plane of a lens element that collimates light emitted by the display, making the displayed imagery appear to be "at infinity," or very far away. The longer the focal length of the lens element, the larger the eyebox, making for easier eye alignment. However, a display device with such a lens is also longer and larger, which can be undesirable. For example, the length/size of a head-mounted display with a simple magnifier creates a moment pulling the head-mounted display downward, which is not comfortable for the wearer and can create eye alignment problems. Such a moment can be counter balanced, but adding a counter balance also adds to the weight of the head-mounted device on the user's head.

To reduce the focal length, some VR/AR display systems use simple polarization optics to fold the inline path that light would take. The resultant system is more compact. However, the images produced can be dim because the light within the system is repeatedly reflected and transmitted through various optical components that remove a portion of the light.

In VR/AR head mounted displays (HMDs) using simple magnifiers, the virtual images typically exhibit a large amount of distortion and aberration, especially in the periphery. Although some of the distortion and aberration can be corrected by pre-distorting the displayed image on the HMD's screen before being collimated by the HMD optics, the apparent distortion is viewpoint dependent in 3D space (horizontal, vertical and depth viewpoint offsets). This distortion can be mitigated by storing several correction maps, each for a different eye position, tracking the viewer's eye location, and applying the appropriate captured or computed pre-distortion correction map or even a blend of several distortion maps. However, with large eyeboxes, many eye locations are possible and therefore many maps would be needed, requiring a large amount of storage and processing power to recall and blend the maps and perform the correction. It would instead be preferable to optically correct the distortion and aberrations.

SUMMARY

One embodiment presented herein is a display system that includes a display configured to emit virtual content, a collimator element configured to collimate light emitted by the display, and a corrector plate disposed between the collimator element and an eyepiece, wherein the corrector plate compensates for sub-optimal collimation of off-axis light at an edge of a field of view (FOV) corresponding to the display system.

Another embodiment presented herein is a method that includes emitting virtual content using a display, collimating light emitted by the display corresponding to the virtual content, compensating for sub-optimal collimation of off-axis light in the collimated light at an edge of a field of view, and outputting the virtual content after compensating for the sub-optimal collimation.

Another embodiment presented herein is a display system that includes a display configured to emit virtual content where an intensity of light emitted by each emitter in the display is controllable in multiple directions, and where the display is configured to, by controlling the intensity of a plurality of the emitters, pre-distort light corresponding to the virtual content to compensate for sub-optimal collimation of off-axis light at an edge of a FOV. The display system also includes a collimator element configured to collimate the pre-distorted light emitted by the display.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Various embodiments of augmented reality (AR)/virtual reality (VR) display devices with either a correction lens or a pre-distortion light-field display are described herein. Aberrations can occur when attempting to collimate light emitted by a display in an AR or VR display device, especially when the device includes a wide field of view. As mentioned above, collimating the light emitted from the display can make the displayed imagery appear to be "at infinity," or very far away when in reality the display is very close to the user. A mirror or lens can be used to collimate the light emitted by the display. These collimators typically have a spherical or parabolic shape which can collimate the light that is on-axis (e.g., the light in the same direction as the user's gaze). However, for larger apertures and off-axis light (e.g., light that enters the eye at an angle relative to the user's gaze), the light is less and less collimated as the angle of the light relative to the user's gaze increases. This results in aberrations near the edge of the field of view (FOV), especially with AR/VR devices with wide FOVs. These aberrations become more noticeable as the user's eye moves relative to the AR/VR device. As the user moves her eye relative to an AR/VR headset, the display objects are distorted.

The embodiments herein use a corrector plate or a light field display to compensate for sub-optimal collimation at the edge of the FOV. In one embodiment, the corrector plate is disposed between the collimator and the viewer so that the light at the edge of the FOV can be corrected so that the aberrations mentioned above do not occur. In another embodiment, rather than using a corrector plate, the AR/VR display device can include a light field display that can use color intensity to pre-distort emitted light to compensate for sub-optimal collimation at the edge of the FOV. In this manner, the AR/VR display device can mitigate aberrations or distortions as the user moves her eyes relative to the display device without using any pre-distortion correction maps.

Figure 1:
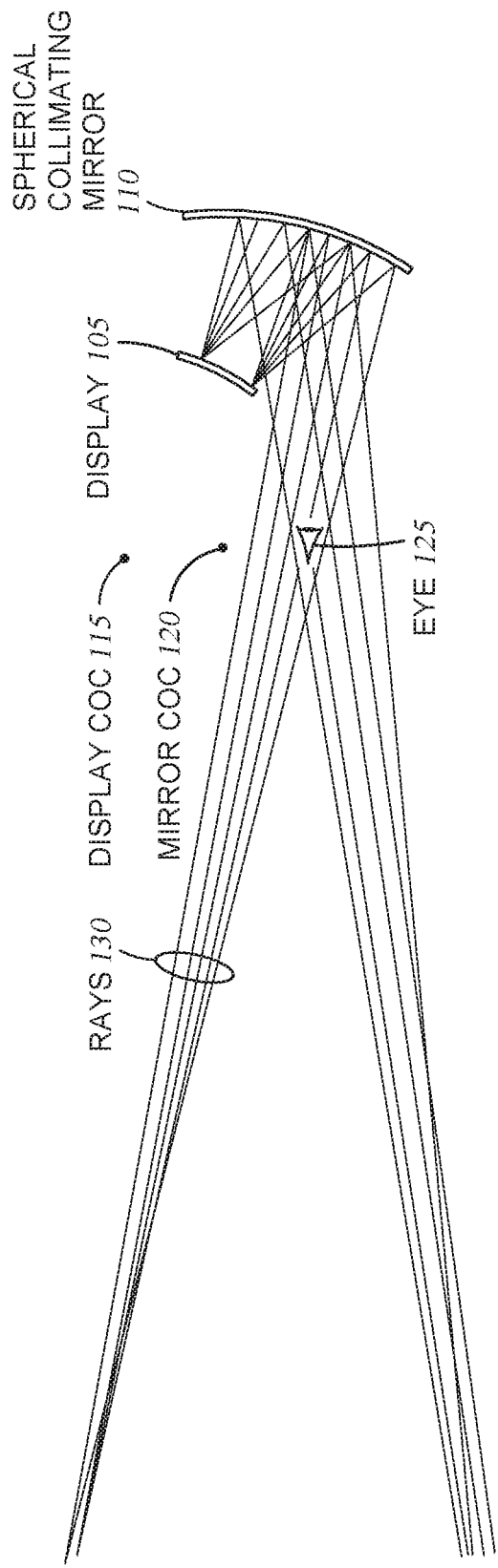
FIG. 1 is an optical arrangement that results in sub-optimal collimation of off-axis light, according to one embodiment herein.

FIG. 1 is an optical arrangement that results in sub-optimal collimation of off-axis light, according to one embodiment herein. In FIG. 1, the light emitted by the display 105 (whose path is illustrated by the rays 130) is reflected by a spherical collimating mirror 110 towards the eye 125 of the user. In this embodiment, the display 105 is curved with a center of curvature (COC) 115. The COC 120 of the mirror 110 is also illustrated.

The spherical (or parabolic) collimating mirror 110 can collimate the light that is in the direction of the gaze of the eye 125 (e.g., on-axis) but is not as good at collimating the off-axis light or with large aperture mirrors. As shown in FIG. 1, the outer rays 130 cross each other rather than being collimated. The light from a pixel on the display will not appear to come from the same angle for different eye locations, as it should if the light was collimated or if the pixel appeared at an infinite distance. This can result in the aberrations mentioned above. For example, as the relative location of the eye 125 to the AR/VR display device changes, a displayed VR or AR object that was previously in front of the user can also move, warp, and appear distorted (no longer at infinity, or far away from the user).

These aberrations can be compensated for if the location of the eye 125 relative to the AR/VR headset is known. Thus, some headsets include eye tracking systems for detecting the current location of the eye and can use pre-distortion correction maps with different wearer eye positions to compensate for the aberrations. However, the embodiments herein describe using AR/VR display devices with either a corrector plate (or lens) or a pre-distortion light field display to compensate for sub-optimal collimation of the off-axis light near the edge of the field of view. As such, these AR/VR display devices can omit eye tracking systems (and without using the pre-distortion correction maps) and still avoid the aberrations described above when the location of the eye relative to the headset is unknown.

Figure 2:
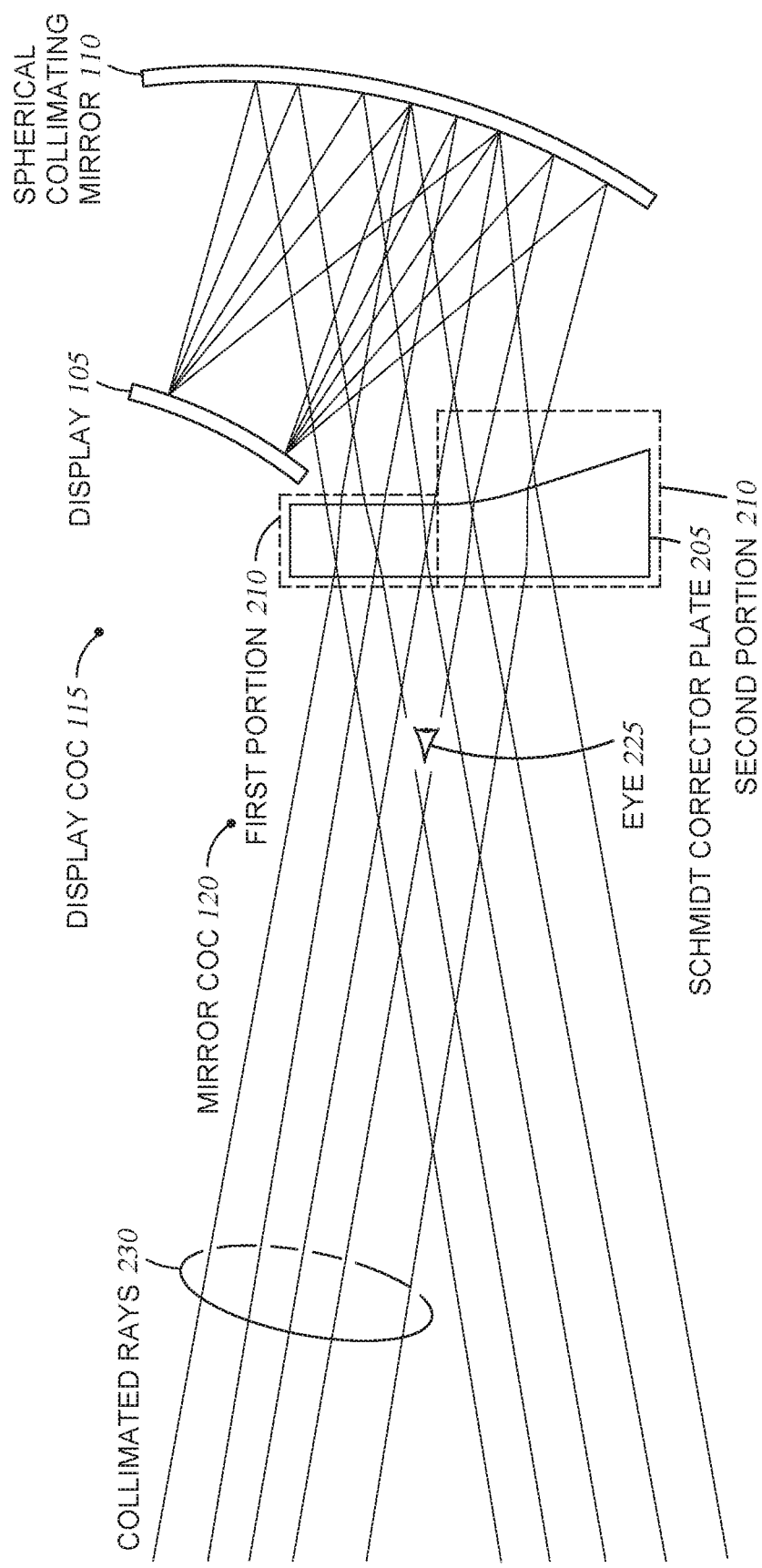
FIG. 2 is an optical arrangement with a Schmidt corrector plate for a VR display device, according to one embodiment herein.

FIG. 2 is an optical arrangement with a Schmidt corrector plate for a VR display device, according to one embodiment herein. As shown, FIG. 2 illustrates using a Schmidt corrector plate 205 to collimate light near the edge of a user's FOV. The corrector plate 205 is disposed between the eye 225 and the spherical collimating mirror 110. Thus, before the light emitted by the display 105 can reach the eye 225, it first passes through the corrector plate 205.

The corrector plate 205 includes a first portion 210 and a second portion 210. Generally, the first portion 210 is where the light at the center of the field of view passes through the Schmidt corrector plate 205. Because the light at the center is already substantially collimated by the collimating mirror 110, the shape of the corrector plate 205 in the first portion 210 is substantially flat (e.g., the two sides of the corrector plate 205 are parallel) so that the light remains collimated when passing through the corrector plate 205. That is, the thickness of the first portion 210 is substantially constant.

The light at the edge of the field of the view substantially passes through the second portion 210 of the corrector plate 205. As discussed above, this light may be sub-optimally collimated (i.e., less collimated than desired). To better collimate the light at the edge, the shape of the corrector plate 205 is not flat in the second portion 210. Instead, in this example, one side of the corrector plate 205 (e.g., the right side) slopes away from the opposite side of the corrector plate 205 (e.g., the left side). As such, the distance between the left and right sides of the corrector plate 205 changes in the second portion 210. Put differently, the thickness of the plate 205 in the second portion 210 various. As a result, the direction of the light passing through the second portion 210 is changed to become collimated rays 230. Thus, the display device in FIG. 2 can remove the aberrations at the edge without relying on eye tracking system. The light from a pixel on the display device now consistently appears to come from the same angle for different eye locations, as it should for collimated light or if the pixel was at an infinite distance.

Although the display 105 is illustrated as being a curved display (e.g., a curved organic light emitting display (OLED)) this is not a requirement. The display 105 can also be a flat display. Further, in one embodiment, the mirror 110 is a 50/50 beam splitter. The corrector plate 205 can be made from glass or any suitable transparent material.

Figure 3:
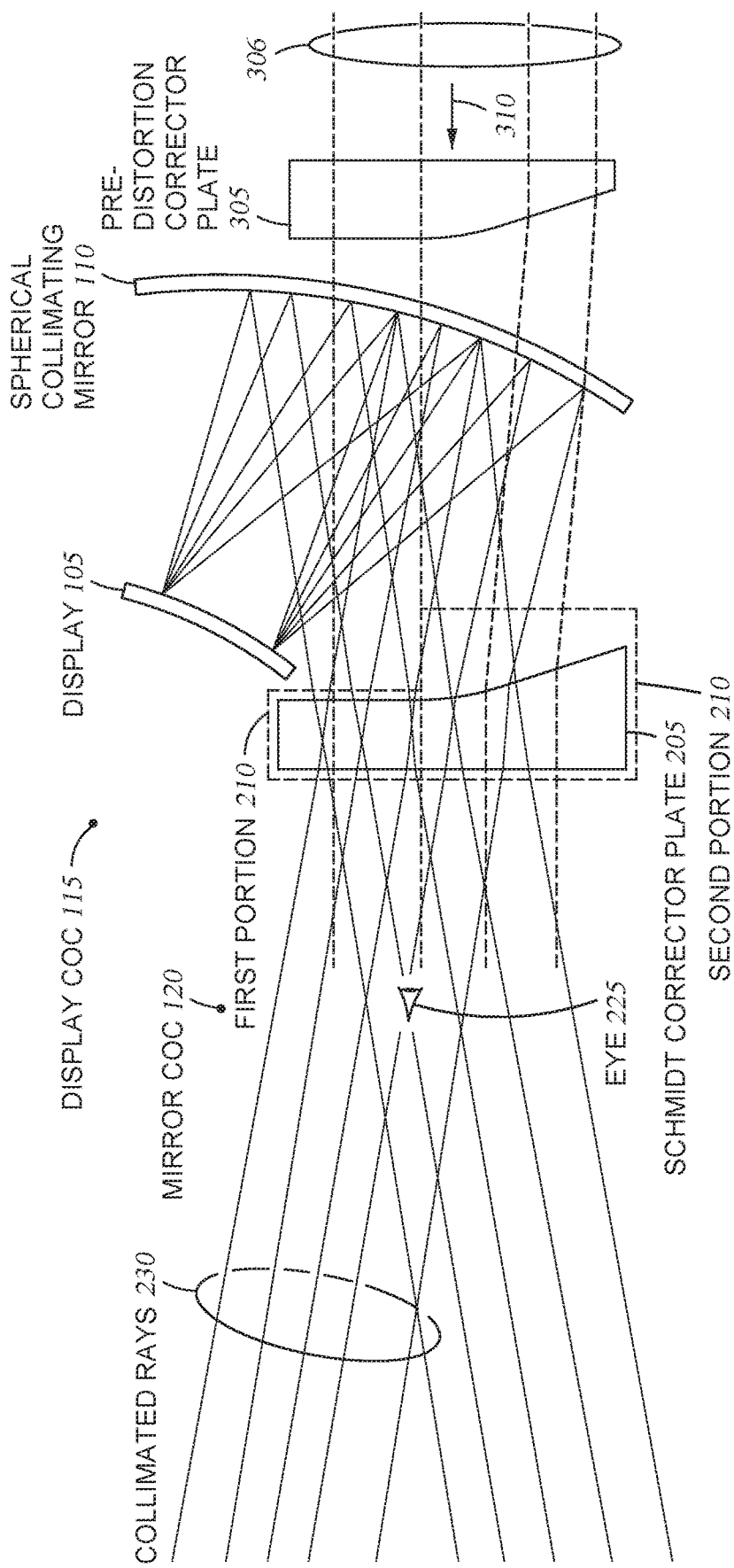
FIG. 3 is an optical arrangement with a Schmidt corrector plate for an AR display device, according to one embodiment herein.

While FIG. 2 illustrates using the corrector plate 205 with a VR display device, FIG. 3 an optical arrangement with a Schmidt corrector plate for an AR display device. FIG. 3 is similar to FIG. 2, except the AR display device includes a pre-distortion corrector plate 305. As shown by the arrow 310, light from the environment passes through the pre-distortion corrector plate 305, through the spherical collimating mirror 110, and through the corrector plate 205 before reaching the user's eye 225. The collimating mirror 110 may be a 50/50 beam splitter which permits the light from the environment to pass through without substantially changing its direction. The display 105 emits light for displaying an AR object which is then combined with the light from the environment at the mirror 110.

The pre-distortion corrector plate 305 changes the direction of the rays 306 from the environment to correct for the distortion that occurs when the rays pass through the corrector plate 205. Thus, whatever affect the pre-distortion corrector plate 305 has on the light from the environment is cancelled out by the Schmidt corrector plate 205. As such, the objects in the environment appear normal to the user, without distortion.

In one embodiment, the corrector plate 305 is similar to the corrector plate 205 except for being inverted. However, this may be an oversimplification since the shape of the pre-distortion correction plate 305 should also account for the separation distance between the two corrector plates 205 and 305.

Figure 4:
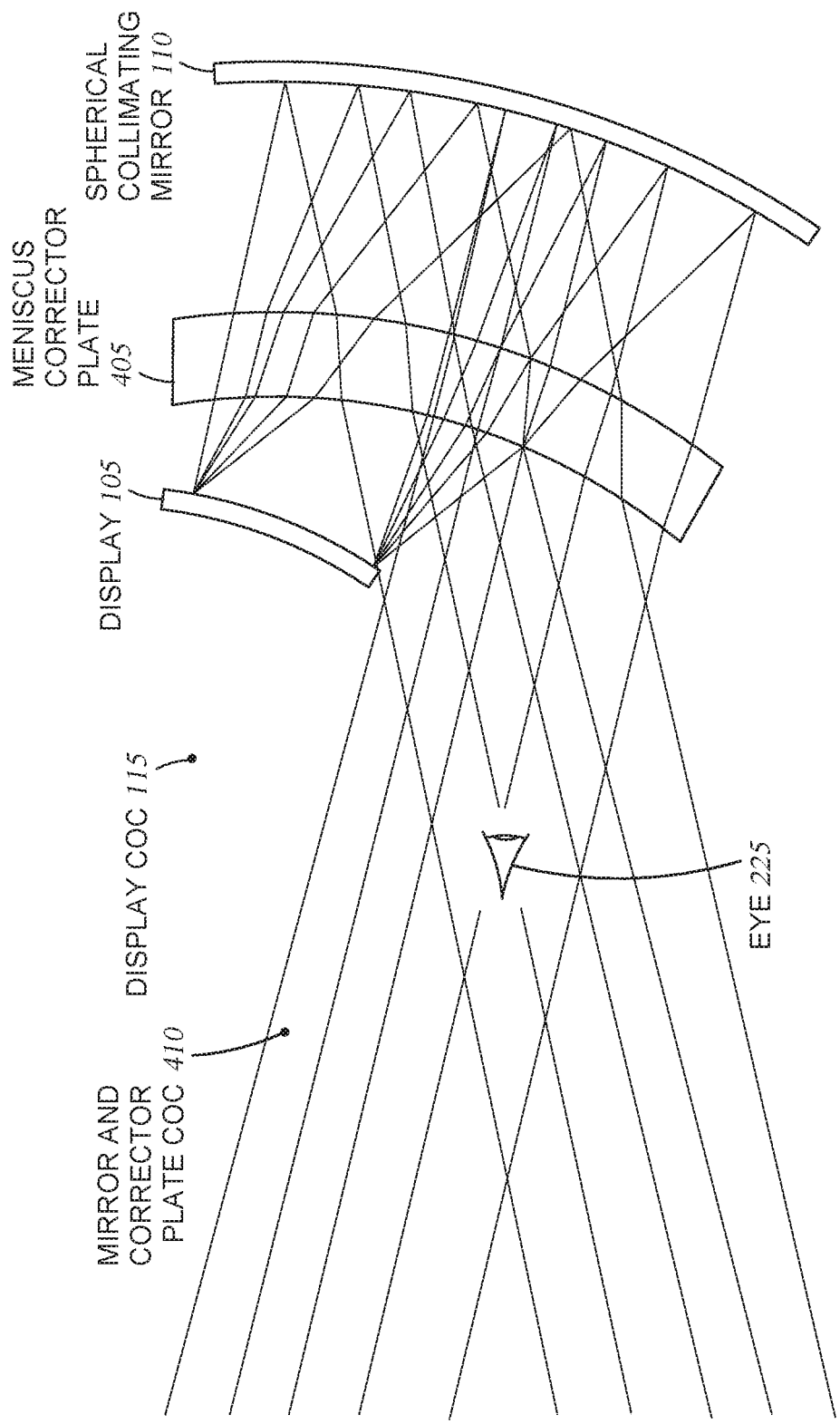
FIG. 4 is an optical arrangement with a Meniscus corrector plate for a VR display device, according to one embodiment herein.

FIG. 4 is an optical arrangement with a Meniscus corrector plate for a VR display device, according to one embodiment herein. As shown, FIG. 4 illustrates using a Meniscus corrector plate 205 to collimate light near the edge of a user's field of view. In this embodiment, the Meniscus corrector plate 405 is disposed between the display 105 and the spherical collimating mirror 110 so that light passes through the corrector plate 405 before reaching the mirror 110. The Meniscus corrector plate 405 is also between the collimating mirror 110 and the eye 225. Thus, the light emitted by the display 105 passes through the meniscus corrector plate 405 twice: once before reaching the mirror 110, and again after being reflected by the mirror 110. Moreover, in FIG. 4, the Meniscus corrector plate 405 has the same COC 410 as the collimating mirror 110.

In one embodiment, the VR display device illustrated in FIG. 4 may be easier to manufacture than the VR display device in FIG. 2. For example, once the placement correct index of refraction for the Meniscus corrector plate 405 is identified, the meniscus corrector plate 405 can be more easily aligned with the other optical components in the display device when compared to the Schmidt corrector plate illustrated in FIGS. 2 and 3.

Figure 5:
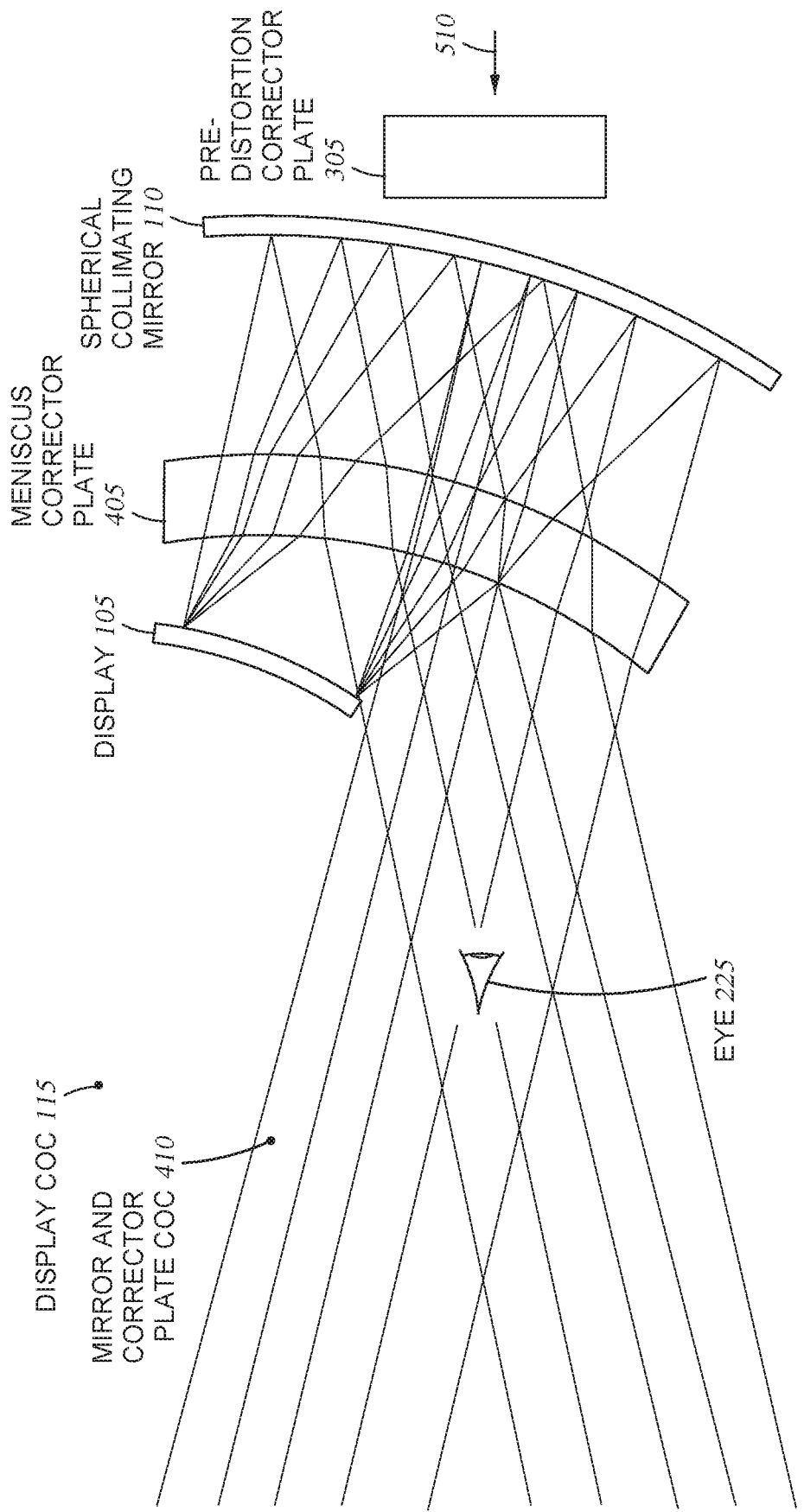
FIG. 5 is an optical arrangement with a Meniscus corrector plate for an AR display device, according to one embodiment herein.

FIG. 5 is an optical arrangement with a Meniscus corrector plate for an AR display device, according to one embodiment herein. As shown, FIG. 5 illustrates an AR display device that uses the Meniscus corrector plate to collimate light emitted from the edge of the display 105. FIG. 5 is similar to FIG. 4, except the AR display device includes a pre-distortion corrector plate 505. As shown by the arrow 510, Light from the environment passes through the pre-distortion corrector plate 505, through the spherical collimating mirror 110, and through the corrector plate 405 before reaching the user's eye 225. The collimating mirror 110 may be a 50/50 beam splitter which permits the light from the environment to pass through without substantially changing its direction. The display 105 emits light for displaying an AR object which is then combined with the light from the environment at the mirror 110.

The pre-distortion corrector plate 505 changes the direction of the rays from the environment to correct for the distortion that occurs when the rays pass through the Meniscus corrector plate 405. Thus, whatever affect the pre-distortion corrector plate 505 has on the light from the environment is cancelled out by the Meniscus corrector plate 405. As such, the objects in the environment appear normal to the user, without distortion. The shape of the pre-distortion corrector plate 505 in FIG. 5 is not intended to show the actual shape of the corrector plate 505, but merely to indicate where the pre-distortion corrector plate 505 can be disposed in the AR display device.

Figure 6:
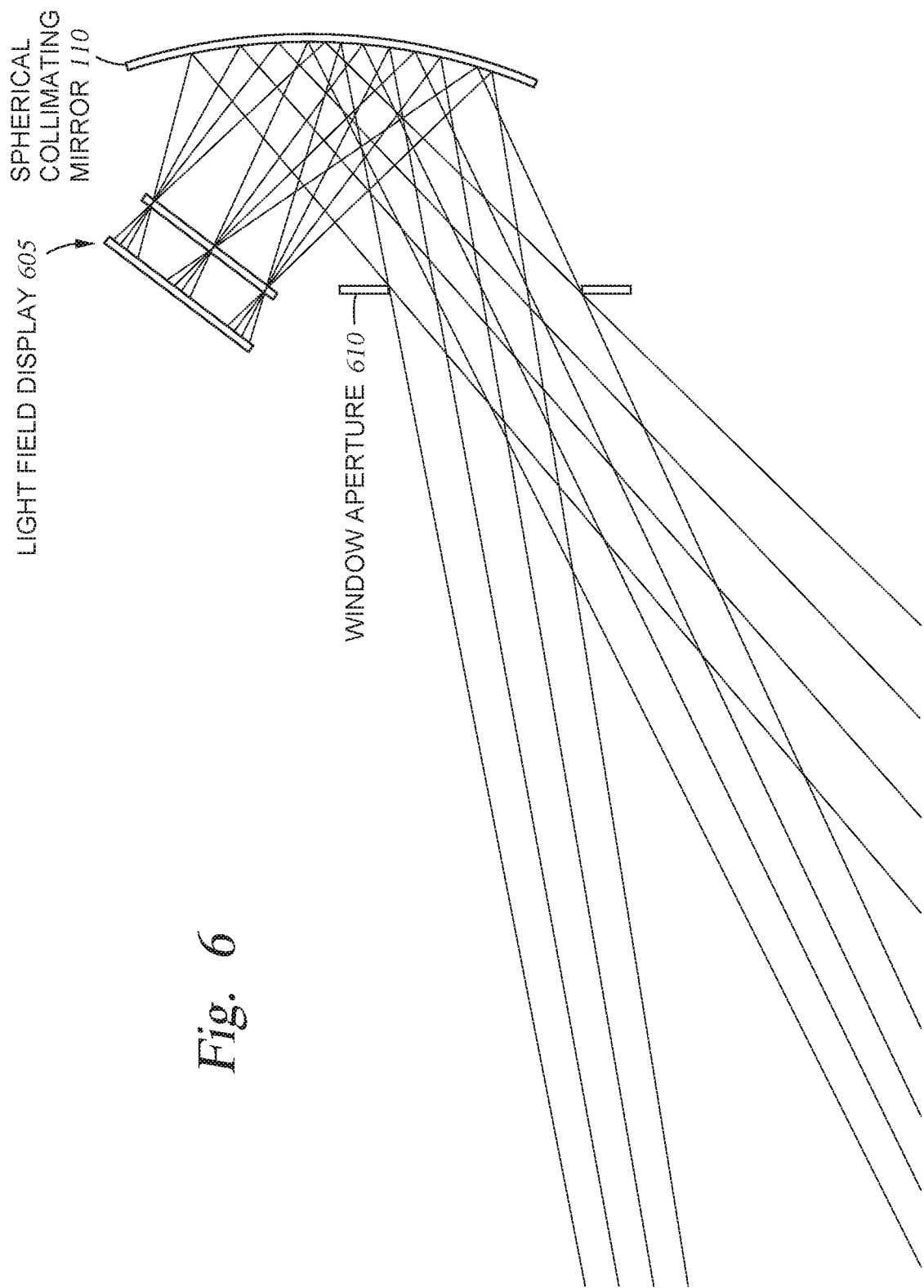
FIG. 6 is an optical arrangement with a light field display, according to one embodiment herein.

FIG. 6 is an optical arrangement with a light field display, according to one embodiment herein. FIG. 6 illustrates using a light field display 605 to compensate for aberrations in the light emitted at the edge of the display when being collimated by the mirror 110. The light field display 605 permits the AR/VR device to control the intensity of the light emitted on all directions for each emitter or pixel. Put differently, the light field display 605 can control the color of the light emitted in each direction by controlling the intensity of the light emitted by the pixels.

The AR/VR device can use the light field display 605 to pre-distort the emitted light to compensate for the sub-optimal collimation at the edges of the display 605. The AR/VR device can determine the desired color of the light received at different angles at the eye of the user. Because the AR/VR device knows the path of the light, the device can control the light field display to adjust the color to get a collimated scene. That is, the light field display 605 can perform pre-distortion so when collimated mirror 110 collimates the light imperfectly, the outputted VR or AR image nonetheless appears in the desired location of the user's field of view. For example, if the AR image should appear at a first location, the AR device can follow the path (which is known) to identify which portion of the light field display 605 emits light that reaches the first location and then instruct the light field display 605 to control the intensity of the emitted light so the color or colors of the AR object appear at the first location. In other words, unlike the previous embodiments where the corrector plates change the path of the rays, in this embodiment, the AR/VR device permits the rays to travel in the direction they are reflected by the mirror 110 (which can include sub-optimal collimation) but controls the color of the light in those rays so that the AR/VR images are displayed in the desired locations to avoid the aberrations and distortions.

Figure 7:
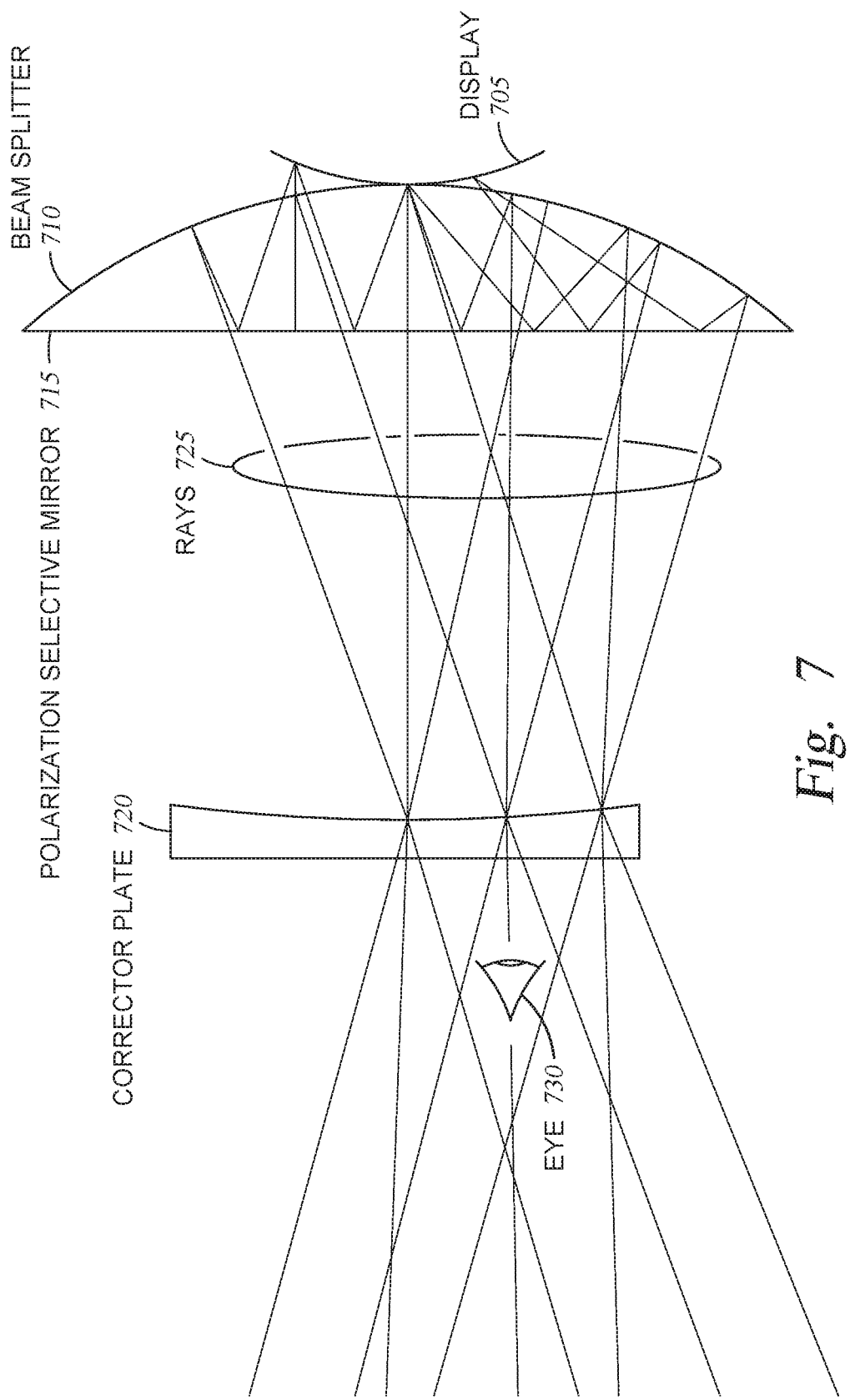
FIG. 7 is an optical arrangement with a pancake optics arrangement, according to one embodiment herein.

FIG. 7 is an optical arrangement with a pancake optics arrangement, according to one embodiment herein. Specifically, FIG. 7 illustrates a side view of a display system with pancake optics arrangement, according to a first embodiment. The arrangement of optical elements includes a display 705, a 50/50 (half-silvered) concave beam splitter 710, a polarization selective mirror 715, and a corrector plate 720. The corrector plate 720 is between the polarization selective mirror 715 and an eye 730 of a viewer. The display 705 may be non-transparent display (e.g., OLED) in the case of a VR display device. The display 705 is depicted as having a compound curve shape, which counteracts Petzval field curvature and may produce a better image quality with less distortion; however, a flat display 705 could be used. Further, while shown as having a curved, spherical shape, the beam splitter 710 could be free form or a Magnus mirror.

The beam splitter 710 and the polarization selective mirror 715 form what is referred to as pancake optics which collimates the light emitted by the display 705. The rays 725 illustrate how the light emitted by the display 705 is reflected and collimated by the combination of the beam splitter 710 and the polarization selective mirror 715. Generally, the display 705 emits light which passes through the beam splitter 710. The light has a polarization which is reflected by the mirror 715 back in a direction towards the beam splitter 710. The light is reflected by the beam splitter 710, and in so doing, the polarization of the light is changed. The light with this new polarization is then allowed to pass through the polarization selective mirror 715. For example, the polarization selective mirror 715 may reflect vertically polarized light but is transmissive for horizontally polarized light, or reflect right-circularly polarized light but is transmissive for left-circularly polarized light. In the process of reflecting the light within the pancake optics, the light becomes collimated when leaving the polarization selective mirror 715 and traveling towards the eye 720.

However, some of the rays 725 may not be optimally collimated due to the wide field of view of the AR/VR device when leaving the pancake optics. The corrector plate 720 can be shaped to better collimate the rays 725, thereby mitigating the aberrations described above.

In FIG. 7, the corrector plate 720 is disposed at an exit pupil where the rays 725 cross. However, the corrector plate 720 can be disposed closer to the polarization selective mirror 715, although the shape of the plate 720 should be adjusted as this distance shrinks. In any case, adding the corrector plate 720 to the pancake optic system illustrated in FIG. 7 permits a wide field of view to be used without the use of eye tracking in order to correct for sub-optimal collimation and aberrations.

Although FIG. 7 illustrates a VR version of the display device, the corrector plate 720 may also be added to an AR version of the display device.

Figure 8:
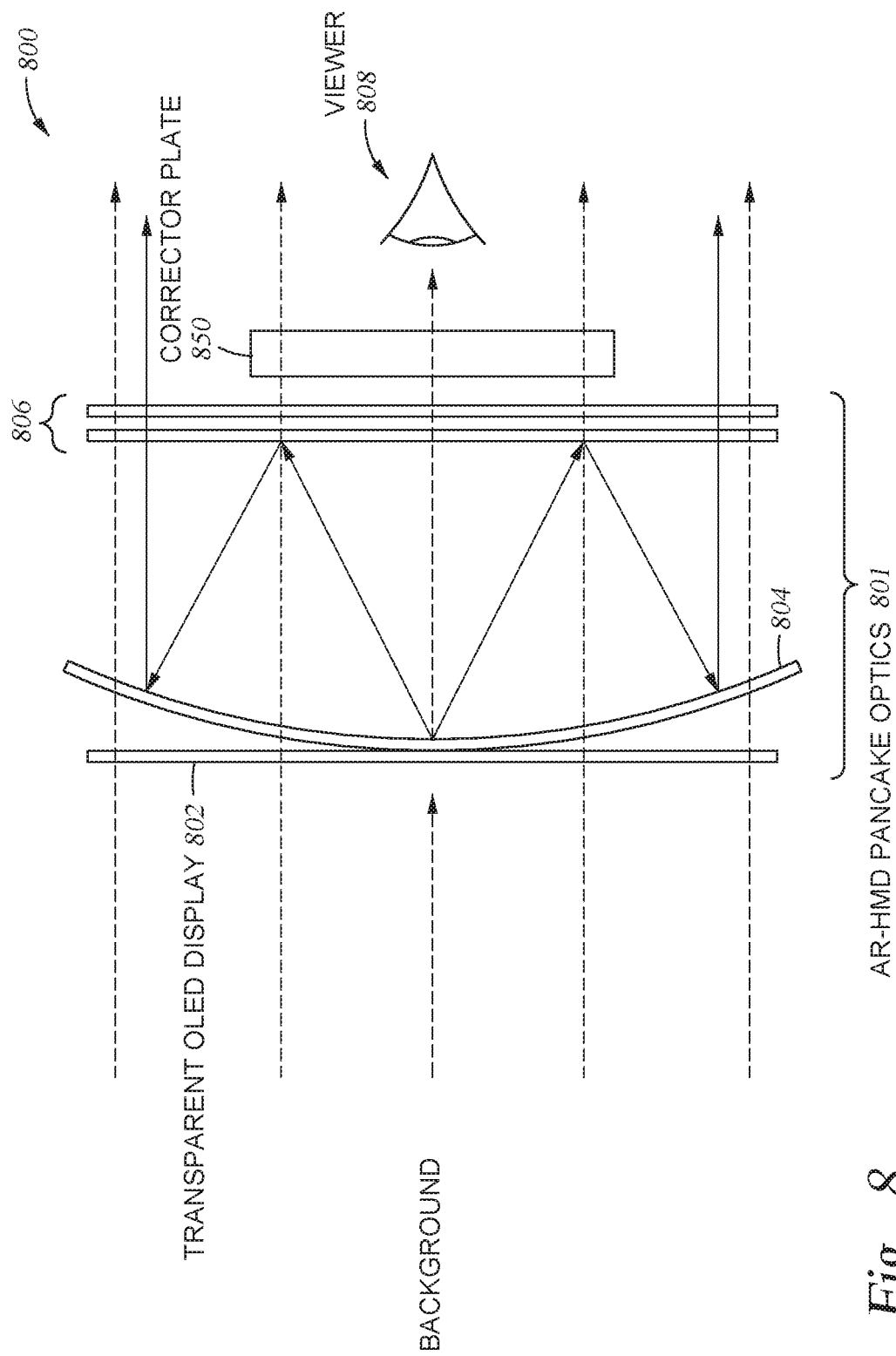
FIG. 8 is an optical arrangement with a pancake optics arrangement for an AR device, according to one embodiment herein.

FIG. 8 is an optical arrangement with a pancake optics arrangement for an AR device, according to one embodiment herein. Specifically, FIG. 8 illustrates an AR version of the pancake optic system illustrated in FIG. 7. FIG. 8 illustrates a simplified side view of a display system 800 with pancake optics arrangement 801, according to a first embodiment. The arrangement 801 of optical elements generally includes a display 802, a 50/50 (half-silvered) concave beam splitter 804, and an optical assembly 806 between the concave beam splitter element and a viewer 808. The display 802 is a transparent OLED. In one embodiment, light emitted from the OLED display 802 is polarized by the provision of a patterned polarizer (not shown; also referred to herein as a "mask") between the OLED transmitters and the concave beam splitter 804. It is also contemplated that the OLED display may itself be capable of emitting polarized light, in one embodiment. In that case, the patterned polarizer/mask is not needed. Although depicted as flat for illustrative purposes, in some embodiments the display 802 may have a cylindrical, compound, or free-form curve shape, which counteracts the optical system's field curvature and may produce a better image quality with less distortion.

FIG. 8 is intended to conceptually illustrate the manner in which light from the ambient environment (background light) and light emitted by the display 802 (i.e., AR content) propagates through the display system 800 to produce a desired viewing experience for the viewer 808. Specifically, at least a portion of the background collimated light (shown with dashed lines) is allowed to propagate through the display system 800 (e.g., an optical arrangement) without reflection. The light emitted by the display 802 (shown in solid lines) is collimated by the display system 800, so as to appear at infinity to the viewer 808.

As shown, a corrector plate 850 is disposed between the viewer 808 and the optics arrangement 801. As discussed above, the corrector plate 850 compensates for sub-optimal collimation of off-axis light at an edge of a FOV corresponding to the display system 800. The corrector plate 850 can be any of the examples above (e.g., Schmidt or Meniscus corrector plates). In this manner, the corrector plate 850 can be used in the system 800 where AR content is combined with environmental light.

Figure 9:
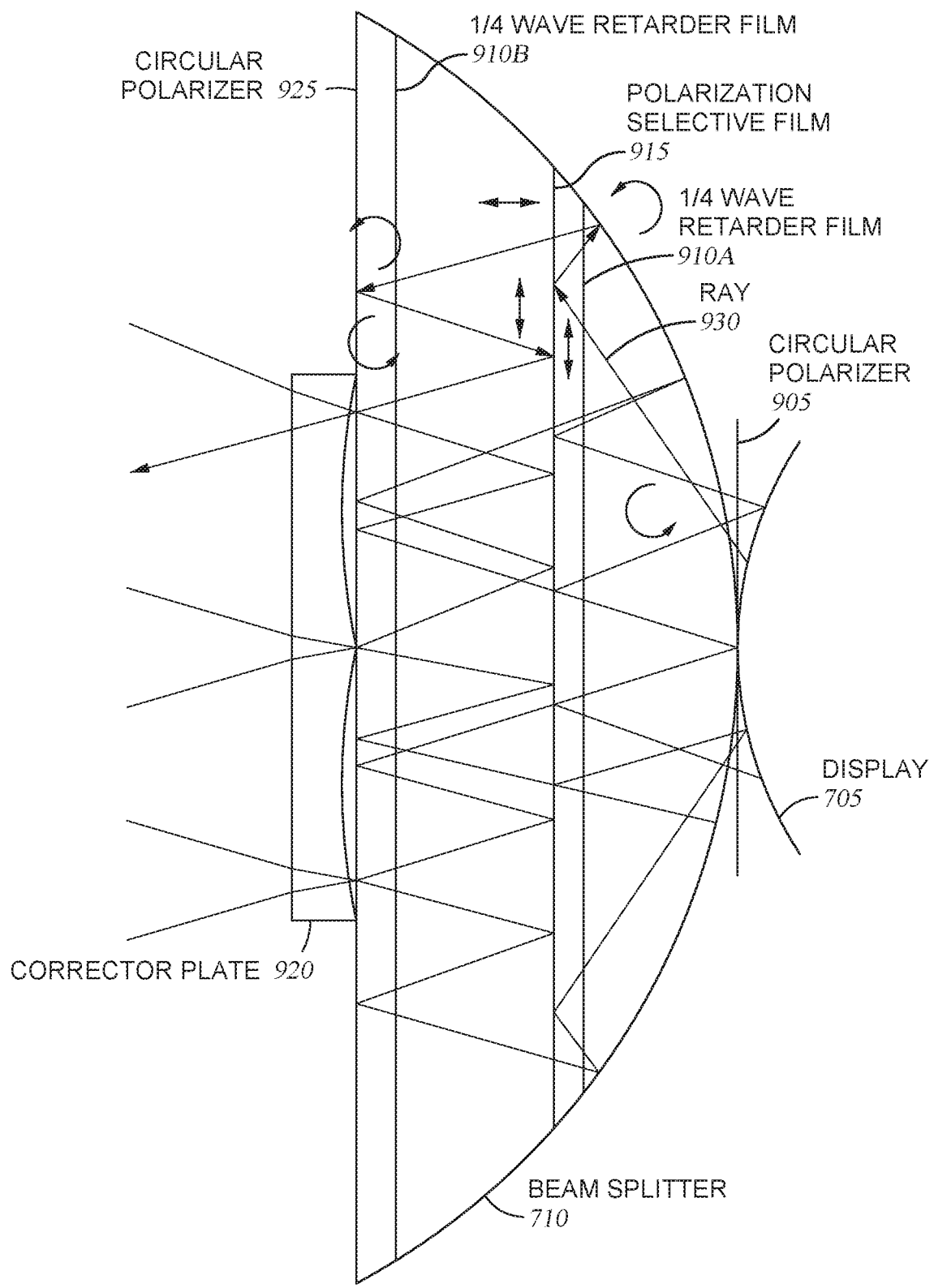
FIG. 9 is an optical arrangement with double pancake optics, according to one embodiment herein.

FIG. 9 is an optical arrangement with double pancake optics, according to one embodiment herein. As shown, FIG. 9 illustrates a side view of a display system with double pancake optics arrangement, according to a first embodiment. FIG. 9 illustrates double pancake optics formed by the beam splitter 710 (which can be the same beam splitter described in FIG. 7), a quarter (¼) wave retarder film 910A, a polarization selective film 915, a ¼ wave retarder film 910B, and a circular polarizer 925. As above, the double pancake optics collimates the light emitted by the display 705 (which can be curved as shown or flat). However, using the double pancake optics folds the path the light travels which permits the corrector plate 920 to be closer to the pancake optics and can result in a more compact design of the VR display device. That is, using the double pancake optics may shrink the depth (the horizontal direction) of the VR display device relative to using the single pancake design illustrated in FIG. 7.

The path of a ray 930 is illustrated to describe the function of the double pancake optics. After being emitted by the display 705, the circular polarizer 905 only permits the left-circularly polarized light pass therethrough. The ray 930 passes through the ¼ wave retarder film which converts the left-circularly polarized light to vertically polarized light that is then reflected by the polarization selective film 915. That is, the selective film 915 reflects vertically polarized light while permitting horizontally polarized light to pass therethrough.

The reflected ray 930 passes again through the retarder film 910A and is converted back to left-circularly polarized light. The ray 930 then reflects off the beam splitter 710, and as a result, is changed from left-circularly polarized light to right-circularly polarized light. The right-circularly polarized light in the ray 930 passes yet again through the retarder film 910A and is this time converted into horizontally polarized light which is then permitted to pass through the polarization selective film 915.

The horizontally polarized light in the ray 930 passes through the ¼ wave retarder film 910B and is converted into right-circularly polarized light. The ray 930 is reflected by the circular polarizer 925, and in so doing, is converted into left-circularly polarized light. The left-circularly polarized light passes through the retarder film 910B and is converted into vertically polarized light which is then reflected by the polarization selective film 915. The ray 930 passes again through the retarder film 910B and converted back into left-circularly polarized light. Because the circular polarizer 925 reflects right-circularly polarized light but permits left-circularly polarized light to pass through, the ray 930 can exit the double pancake optics and enter the corrector plate 920.

However, some of the rays 930 may not be optimally collimated due to the wide field of view of the AR/VR device when leaving the double pancake optics. The corrector plate 920 can be shaped to better collimate the rays 930, thereby mitigating the aberrations described above.

Moreover, while FIG. 9 illustrates a VR display device, the corrector plate 920 and the double pancake optics can also be used in an AR display device where the light is able to enter from the right through a transparent display 705 and pass substantially unaffected through the double pancake optics similar to the AR system illustrated in FIG. 8.

Figure 10:
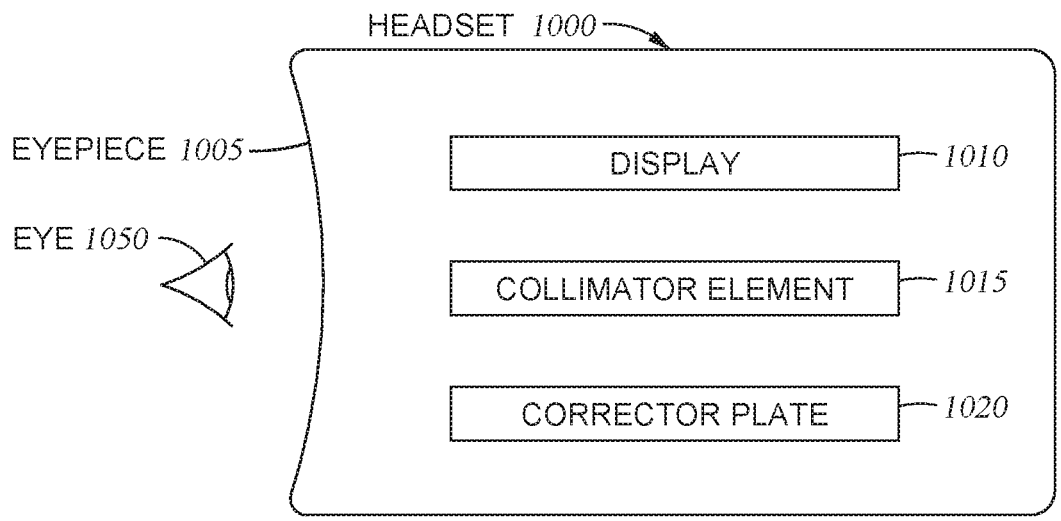
FIG. 10 is a block diagram of a headset for compensating for sub-optimal collimation, according to one embodiment herein.

FIG. 10 is a block diagram of a headset 1000 for compensating for sub-optimal collimation, according to one embodiment herein. As shown, the headset 1000 includes a display 1010, the collimator element 1015, the corrector plate 1020, and an eyepiece 1005. The display 1010 can be any display which emits virtual content (e.g., VR content where no environmental light is used, or AR content which is combined with environmental light). However, in another embodiment, if the display 1010 is a light field display 605 as shown in FIG. 6, than the corrector plate 1020 can be omitted from the headset 1000 since the light field display 605 can pre-distort the emitted light to compensate for the sub-optimal collimation at the edge of the FOV.

The collimator element 1015 can include the curved collimating mirrors illustrated FIGS. 1-6 or the pancake optical systems illustrated in FIGS. 7-9. In general, the collimator element 1015 collimates light emitted by the display 1010. However, the collimation is sub-optimal which can result in aberrations in the virtual content unless compensated for using the corrector plate 1020 (or a light field display).

The corrector plate 1020 can be any of the corrector plates discussed above. Moreover, the arrangement of the corrector plate 1020 relative to the display 1010 and the collimator element 1015 can be like any of the embodiments discussed above.

The eyepiece 1005 defines a location on the headset 1000 where a viewer can align her eye 1050 in order to view the virtual content generated by the display 1010. If the headset 1000 is an AR headset, the viewer may see a view of the environment (either real light that enters the headset 1000 from the environment or a captured image of the environment) that is combined with AR content generated by the display 1010. If the headset 1000 is a VR headset, the viewer sees VR content generated by the display 1010 which may not include any light from the environment.

Figure 11:
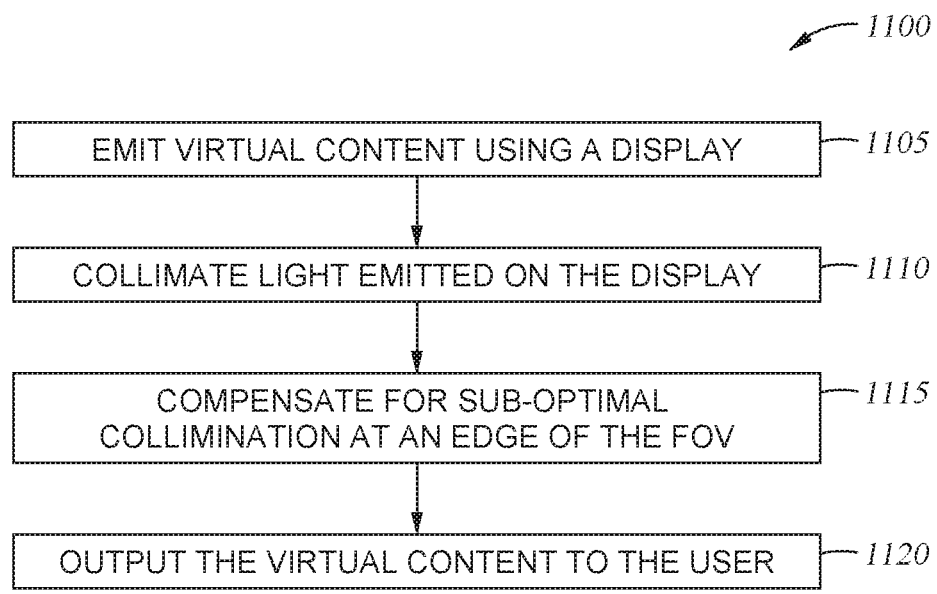
FIG. 11 is a flowchart for compensating for sub-optimal collimation at an edge of a FOV, according to one embodiment herein.

FIG. 11 is a flowchart of a method 1100 for compensating for sub-optimal collimation at an edge of a FOV, according to one embodiment herein. At block 1105, a display emits virtual content. In one embodiment, the virtual content is VR content that immerses the user in a virtual world. When doing so, the headset may block outside light from the environment from reaching to the viewer so that the viewer only sees the VR content emitted by the display. In another embodiment, the virtual content is AR content which is mixed or combined with a scene from the outside environment. In one example, the light from the environment is permitted to enter into the headset and is combined using, e.g., the collimated mirror, with the AR content emitted by the display. In another example, the headset may include a camera which captures an image of the environment and superimposes the AR content on the image which is then generated by the display.

At block 1110, a collimator element collimates the light emitted by the display that includes the virtual content. However, this collimation can be sub-optimal which results in aberrations unless corrected.

At block 1115, a corrector plate compensates for the sub-optimal collimation at an edge of the FOV of the headset. The corrector plate can be any of the corrector plates discussed above. Further, in another embodiment, this compensation can be performed by the display (e.g., performing pre-distortion using a light field display) by controlling the colors of the individual pixels or emitters in the display.

At block 1120, the headset outputs the virtual content to the user (or viewer) at an eyepiece. That is, when the user aligns her eye or eyes with the eyepiece, the user sees the virtual content without aberrations or distortions caused by sub-optimal collimation.

Figure 12:
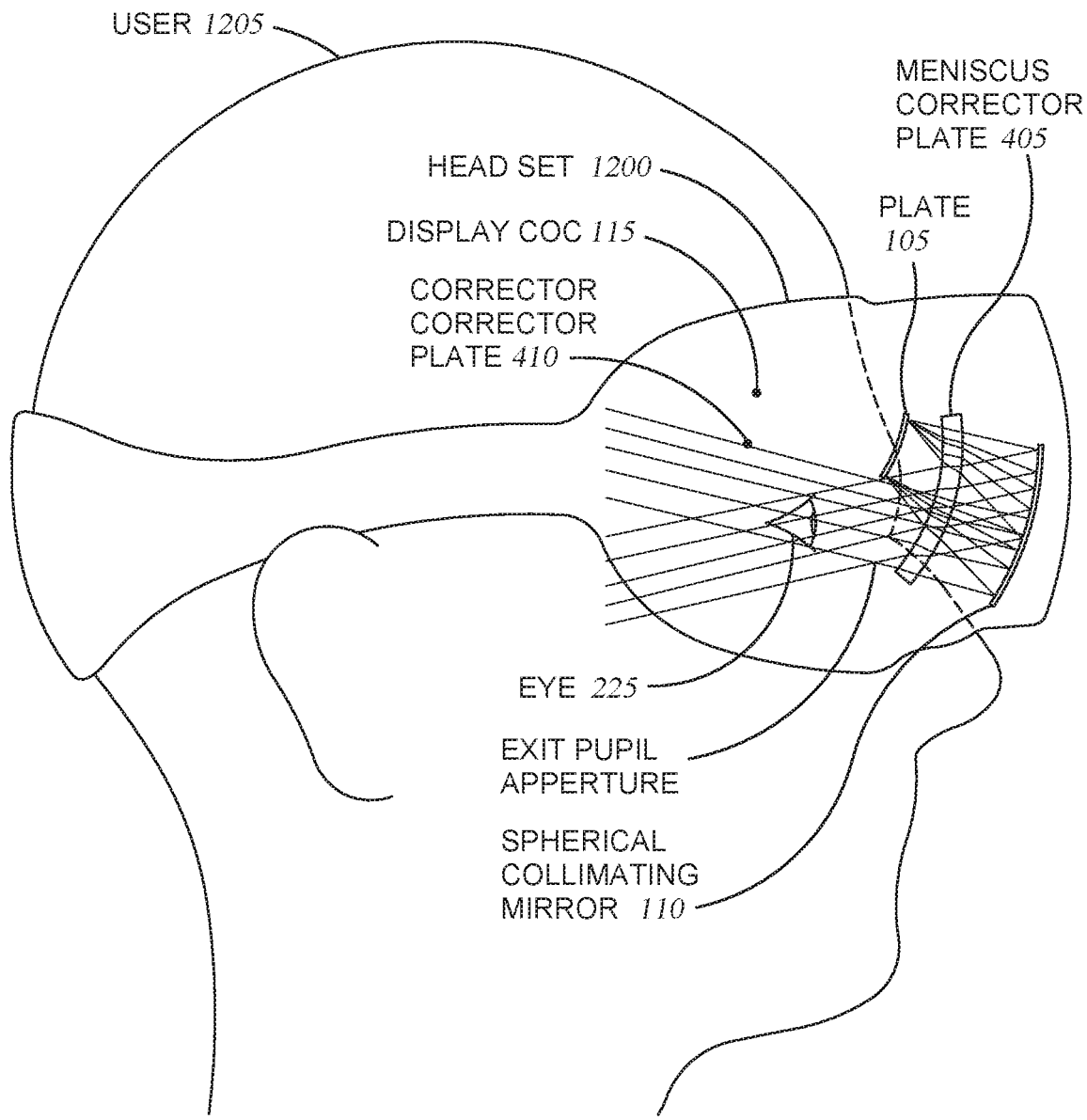
FIG. 12 illustrates a headset for compensating for sub-optimal collimation, according to one embodiment herein.

FIG. 12 illustrates a headset 1200 for compensating for sub-optimal collimation, according to one embodiment herein. The headset 1200 (e.g., a head mounted display) is shown being worn by a user 1205. In this example, the headset 1200 includes the components from FIG. 4, which are not described in detail here. However, the headset 1200 can include internal components from any of the embodiments described above.

In the preceding, reference is made to embodiments of the disclosure. However, the disclosure is not limited to specific described embodiments. Instead, any combination of the preceding features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the preceding aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A display system, comprising:
a display configured to emit virtual content;
a collimator element configured to collimate light emitted by the display; and
a corrector plate disposed between the collimator element and an eyepiece such that the light emitted by the display passes through the corrector plate only once, wherein the corrector plate compensates for sub-optimal collimation of off-axis light at an edge of a field of view (FOV) corresponding to the display system.

2. The display system of claim 1, wherein the collimator element comprises a curved collimating mirror arranged to reflect the light emitted by the display towards the eyepiece.

3. The display system of claim 1, wherein the corrector plate comprises a Schmidt corrector plate comprising a first portion where a thickness is substantially constant and aligns with a center of the FOV and a second portion where a thickness various and aligns with the edge of the FOV.

4. The display system of claim 1, wherein the display is curved.

5. The display system of claim 1, wherein the collimator element comprises a polarization selective mirror and a beam splitter disposed between the display and the eyepiece.

6. The display system of claim 5, wherein the collimator element further comprises a plurality of films that, in combination with the polarization selective mirror and the beam splitter, folds a path of the light emitted by the display.

7. The display system of claim 1, wherein the virtual content is virtual reality (VR) content where environmental light is blocked from being seen by a user through the eyepiece.

8. The display system of claim 1, wherein the virtual content is augmented reality (AR) content, the display system further comprising:
a pre-distortion corrector plate through which environmental light passes before reaching the collimator element and being combined with the AR content.

9. A method comprising:
emitting virtual content using a display;
collimating, using a collimator element, light emitted by the display corresponding to the virtual content;
compensating for sub-optimal collimation of off-axis light in the collimated light at an edge of a field of view using a corrector plate, wherein the light emitted by the display passes through the corrector plate only once and wherein the corrector plate is disposed between the collimator element and an eyepiece; and outputting the virtual content after compensating for the sub-optimal collimation.

10. The method of claim 9, wherein collimating the light comprises reflecting the light emitted by the display off of a curved collimating mirror, and wherein compensating for sub-optimal collimation of off-axis light in the collimated light is performed without an eye tracking system and without using any pre-distortion correction maps.

11. The method of claim 9, wherein compensating for the sub-optimal collimation of the off-axis light comprises passing the off-axis light through at least one of a Schmidt corrector plate and a Meniscus corrector plate.

12. The method of claim 9, wherein the virtual content is VR content where environmental light is blocked from being outputted to a user.

13. The method of claim 9, wherein the virtual content is AR content, wherein the method comprises:
   pre-distorting environmental light; and
   combining the pre-distorted environmental light with the collimated light so that the AR content is inserted into a view of a real-world environment.

\* \* \* \* \*